June 18, 1957 R. E. PAYNE ET AL 2,796,173
CLASSIFICATION PROCESS AND APPARATUS
Filed May 9, 1955 12 Sheets-Sheet 7

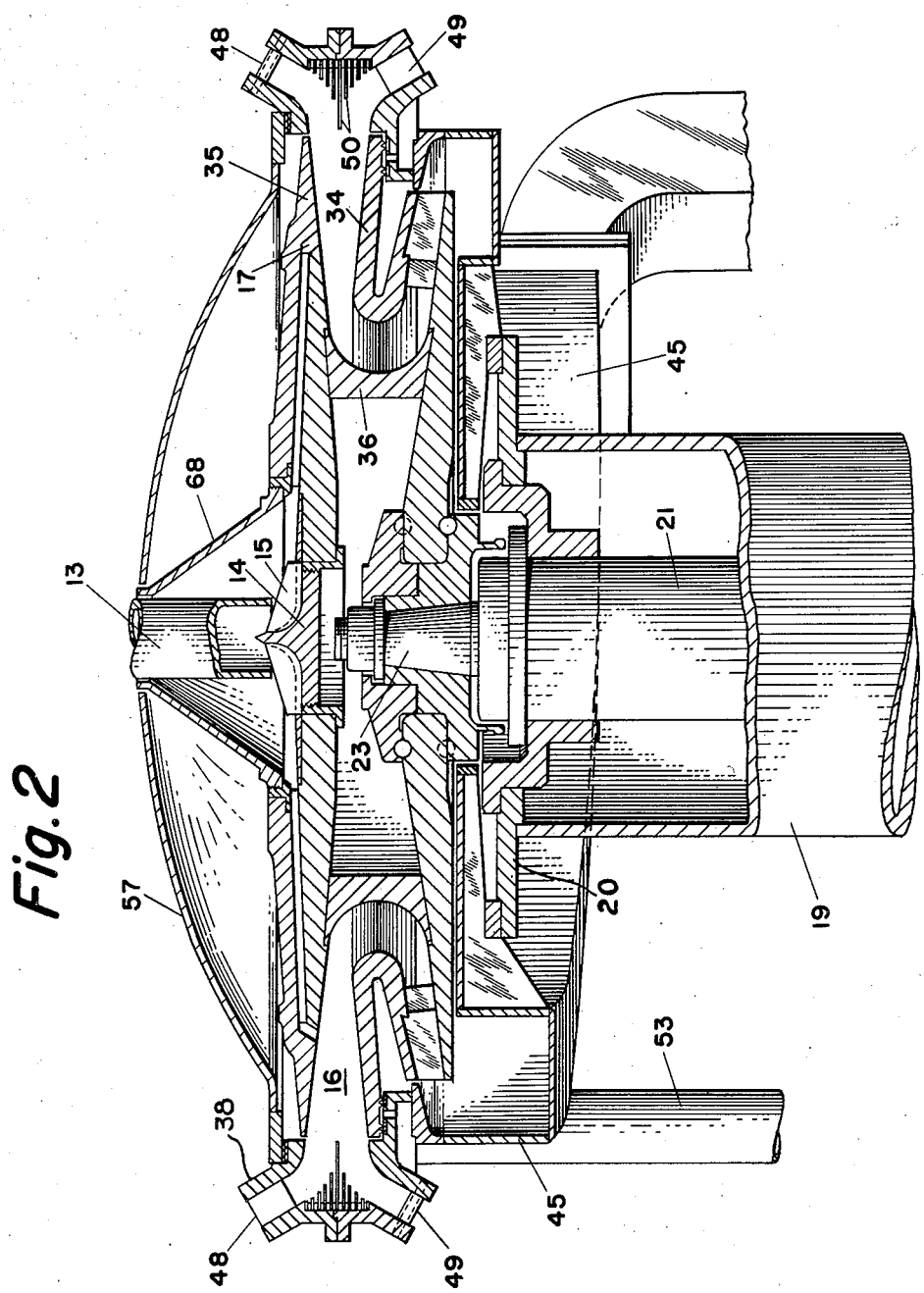

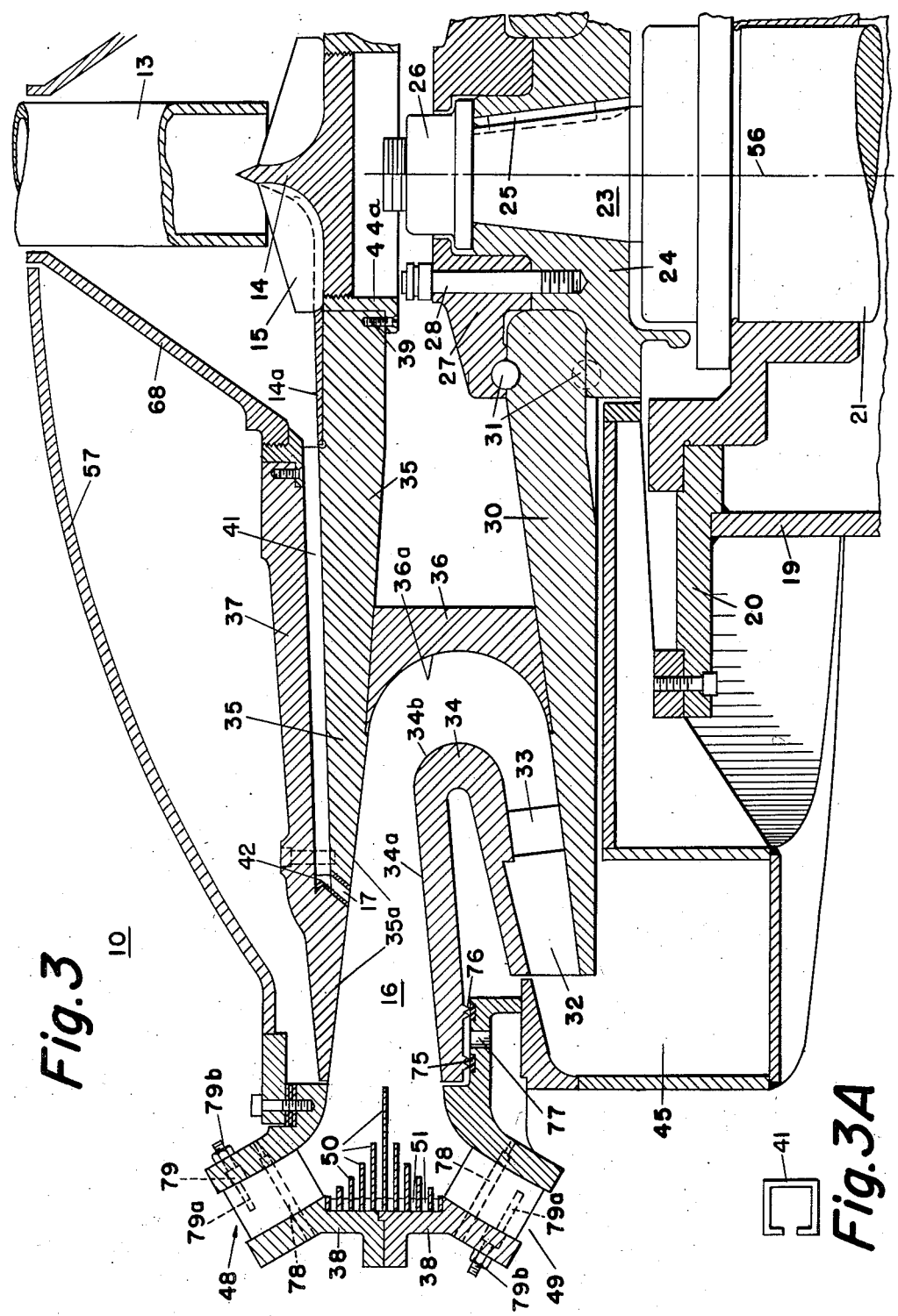

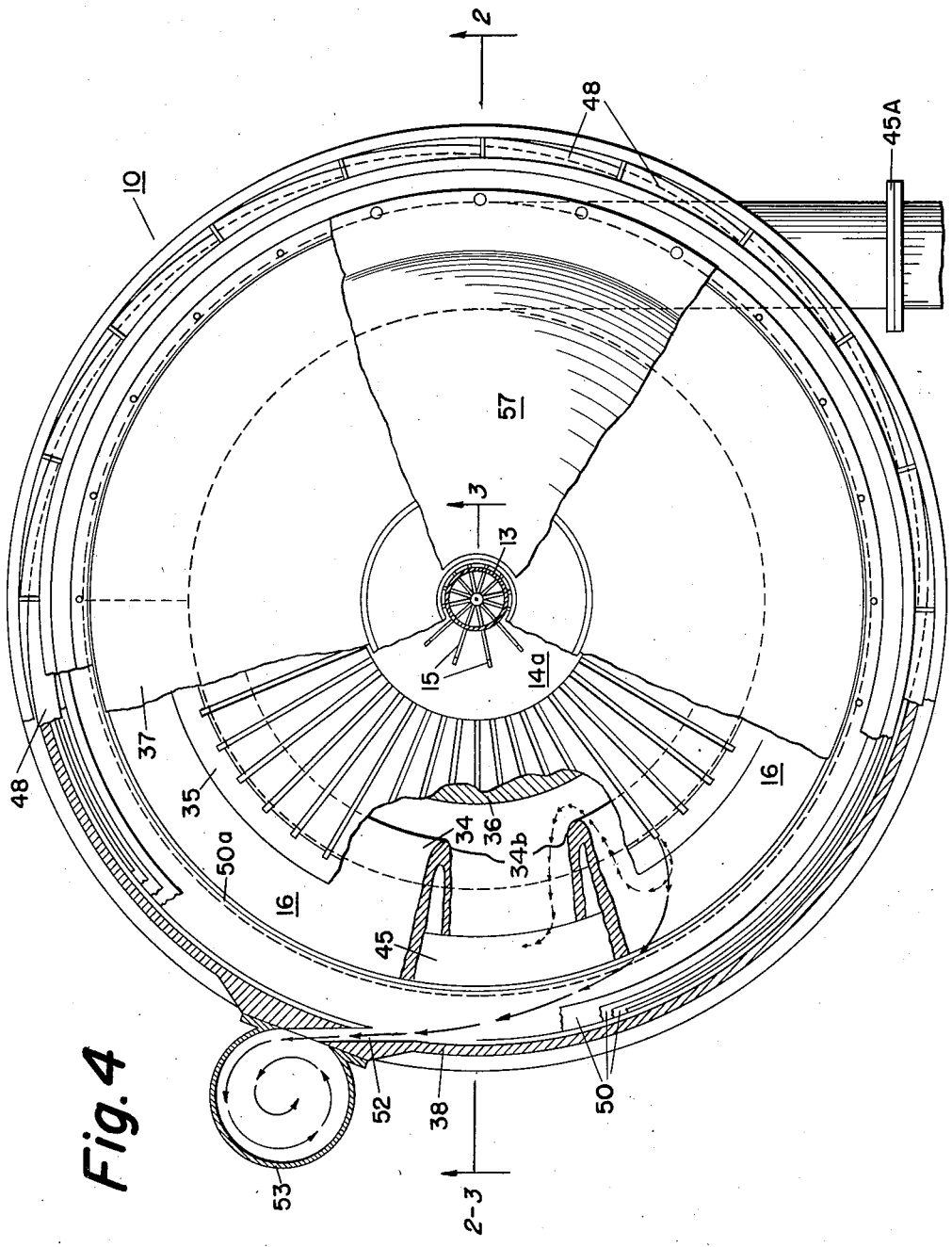

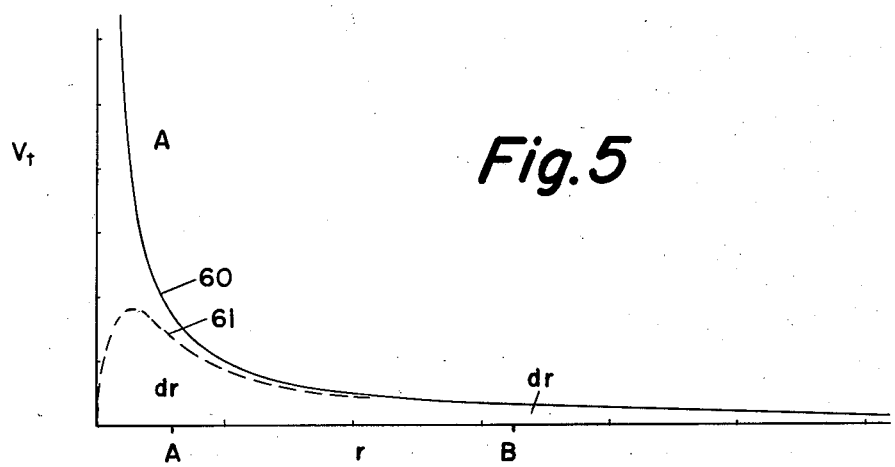
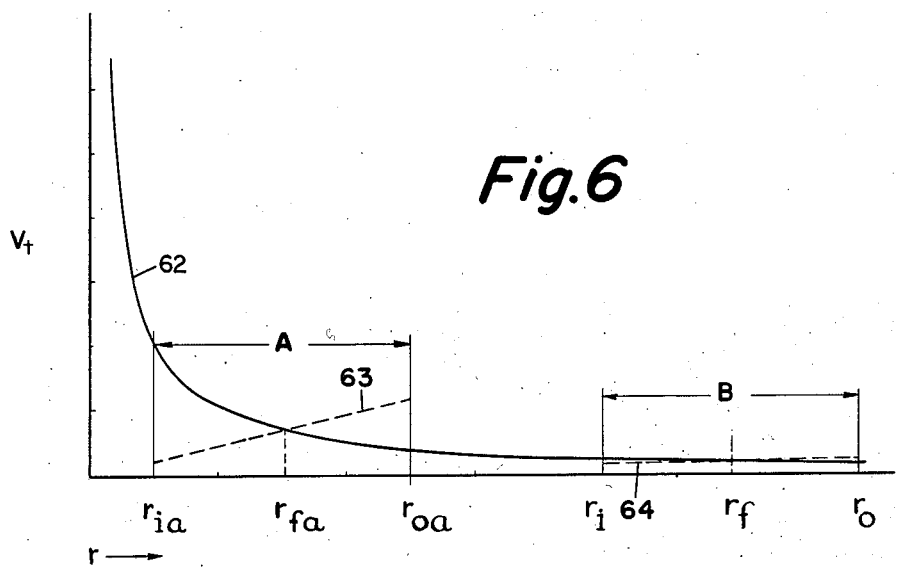
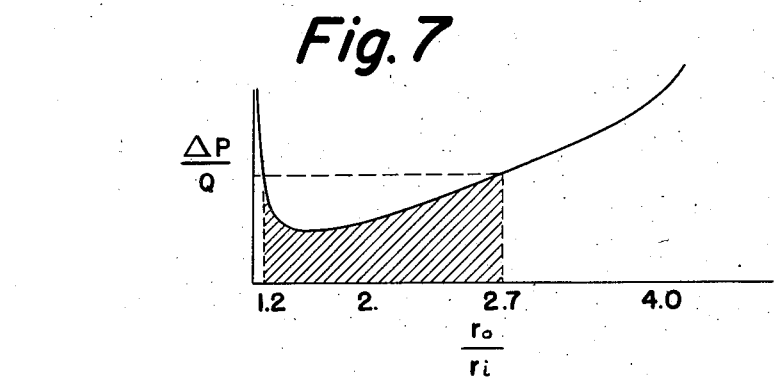

United States Patent Office 2,796,173
Patented June 18, 1957

2,796,173

CLASSIFICATION PROCESS AND APPARATUS

Robert E. Payne, Newtown Square, and Andre C. Lavanchy, Drexel Hill, Pa., assignors to The Sharples Corporation, a corporation of Delaware Application May 9, 1955, Serial No. 506,826

20 Claims. (Cl. 209—144)

This invention relates to improvements in the grading or separation of finely divided material on the basis of size and density and has for an object the provision of a method and means for effecting a separation at high efficiency of particle sizes ranging upwardly from about one micron.

Prior to the present invention, apparatus has been available for the separation of finely divided material, but such apparatus has left much to be desired in a number of respects. The difficulty of separating particles below and above a given size increases as the cut point is reduced. If the cut point be selected at about 20 microns, larger particles above the cut point may be separated from the smaller particles below the cut point with reasonable success. Nevertheless, the capacity in terms of the quantity of powder which may be classified in a given time is of a relatively low order. As the cut point is reduced below 20 microns, the separation is less efficient, meaning an unsatisfactory quantity of larger particles appear in the fine fraction and a substantial quantity of the smaller particles appear in the coarse fraction. The through-put per unit time is also low.

The importance of an efficient method and apparatus for the production of a fraction with all particle sizes within close limits will be self-evident from a consideration of one example. It is known to the medical art that the particle size of penicillin is of major importance with respect to both the administration of the material and its physiological effects. Coarse particles lead to an inferior product in that they tend to settle out of the suspension, clog the hypodermic needle, and remain at high level in the blood stream for only a short time. Small particles create a suspension which is too viscous to be administered. The optimum particle size range is from 5 to 15 microns.

By appropriate control of the grinding of penicillin in conjunction with an efficient classifier, it will be obvious that great benefits are realized. In other fields close control of the particle size in a selected fraction is likewise of great importance.

In carrying out the present invention, streams of fluid, generally air, are directed between spaced walls of the classifying zone in directions to bring the body of air between the walls into an inwardly spiraling vortex flow. An outstanding characteristic of the present invention is that the body of air or fluid in vortical flow between the two walls always comprises a substantially free vortex regardless of the amount of finely divided material in mixture therewith. By "a substantially free vortex," we mean that the angular momentum is conserved throughout the classifying zone and that the tangential velocity, $v_t$, varies inversely with the radius, $r$, throughout the classifying zone.

It has been found that only for a free vortex is it possible to avoid any substantial exchange of energy caused by tangential drag forces between the finely divided material and the air. It is further believed that the present invention for the first time provides an apparatus in which there may achieved in the classifier a free vortex with provisions for feeding the finely divided material into the classifying zone and continuously removing a fine fraction and a coarse fraction therefrom without interchange of energy therebetween. In the first place, the classifying zone itself is disposed a substantial distance from the axis of rotation. The ratio of the width of the classifying zone relative to its spacing from the axis of rotation is made quite small, less than unity. The finely divided material entering the classifying zone intermediate its inner and outer limits is accelerated by a positive mechanical drive so that its rotational speed as it enters the classifying zone is equal to that of the tangential component of velocity of the vortex at the feed point.

In one form of the invention the acceleration of the powder is achieved by positively driving it by a solid driving surface formed by radial channels which may be covered by an outer wall of the classifying zone. The walls of the classifying zone are then rotated at a speed such that the rotational speed of the powder at its point of entrance into the classifying zone equals the speed of rotation of the air at that entrance.

Throughout the classifying zone in which the free vortex is established, the increasing centrifugal force from outer limit to inner limit of the classifying zone is balanced for the selected particle size, i. e., the cut point. This is accomplished by reducing the axial spacing $h$ of the opposed walls of the classifying zone from the outer limit to the inner limit in proportion to $r^2$, where $r$ is the radius from the axis of rotation to a selected axial spacing $h$.

Further in avoidance of friction between the air and the walls of the classifying zone, the walls are rotated at a selected speed and such that there is equalization of speeds of the free vortex and the walls at the feed point. It has been found that by providing a small ratio of the width of the classifying zone relative to the radius at the feed point, there is very little difference between the speed of the walls of the classifying zone at the inner and outer limits thereof relative to that of the free vortex.

By eliminating substantially entirely the several factors which tend to change the balance between the drag force and the centrifugal force throughout the classifying zone for a selected particle size, new and unexpected results have been achieved. Not only has the classification been achieved at higher orders of efficiency, but the capacity or through-put per unit of time is of a new and higher order. The foregoing may be stated differently by saying that the ratio between the finely divided material and the air or fluid within the classifying zone may be made unexpectedly large, for example, a machine of but 40 inches in diameter has a rated capacity of ten tons per hour.

For further objects and advantages of the invention, reference is to be had to the following detailed description taken in conjunction with the accompanying drawings, in which:

Fig. 2 is a sectional view taken on the line 2—2 of Fig. 4;

Fig. 3 is an enlarged sectional view taken on the line 3—3 of Fig. 4;

Fig. 4 is a plan view with parts successively broken away to show details of construction and includes a V-shaped section through the lower plate of the classifying zone;

Figs. 5, 6 and 7 are graphs explanatory of the invention;

Figure 9:
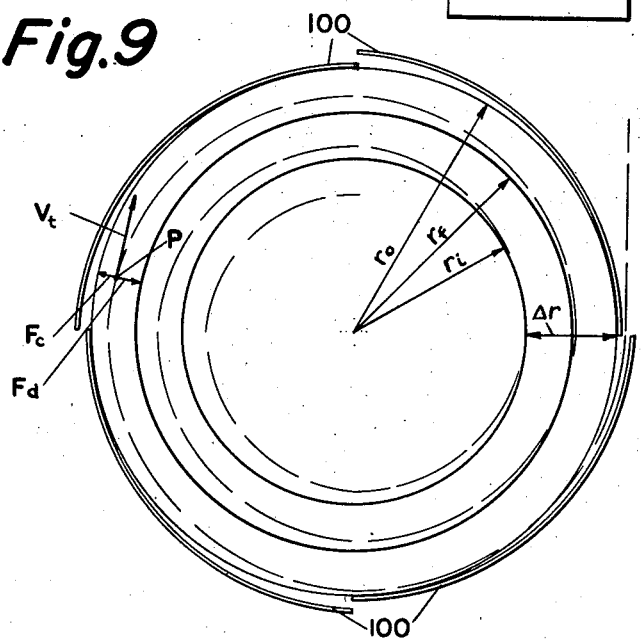
Figure 10:
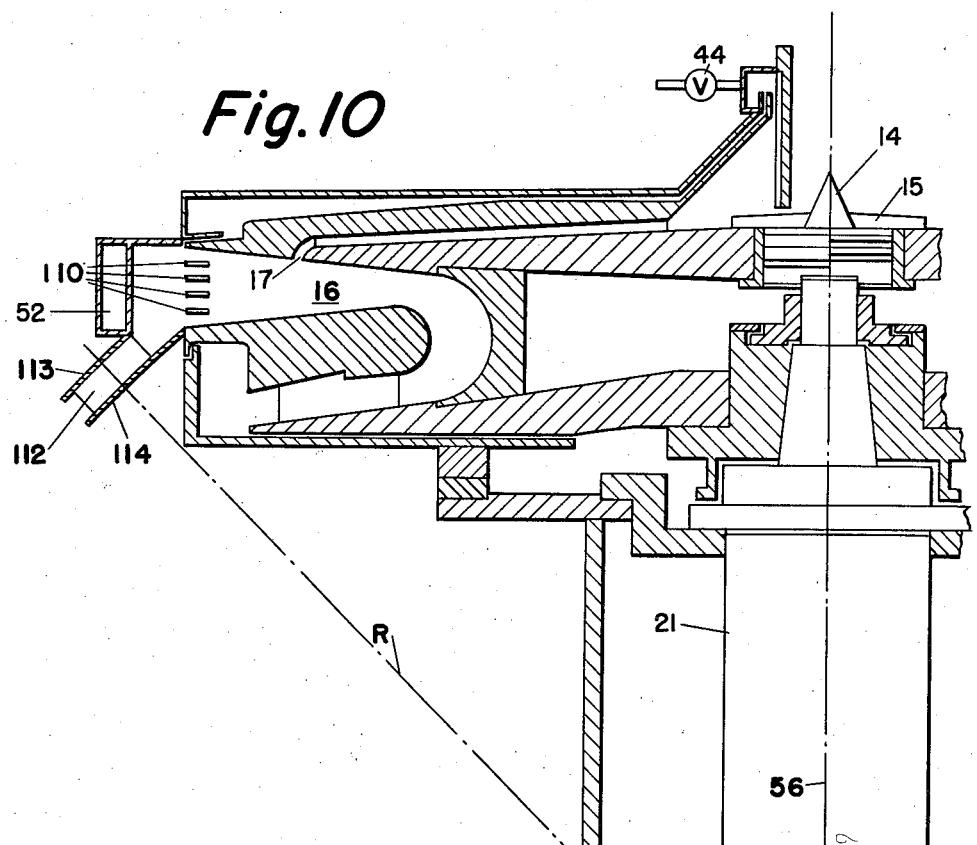
Figure 11:
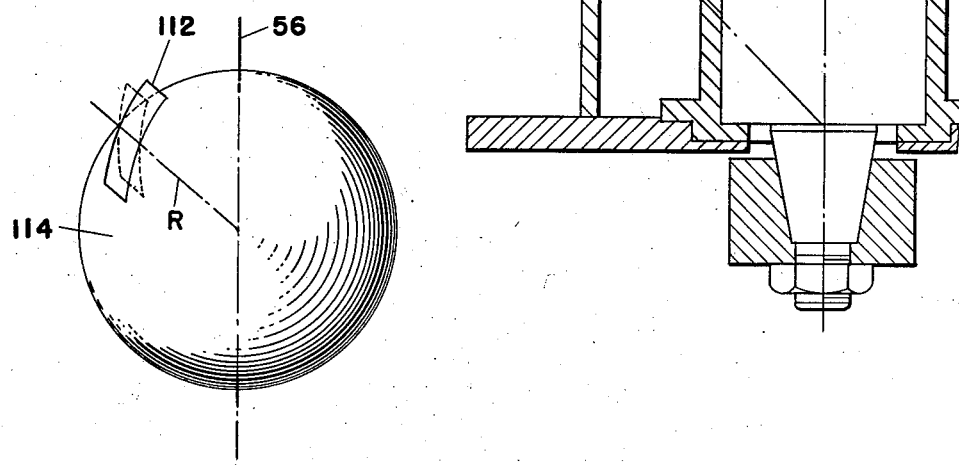
Figure 12:
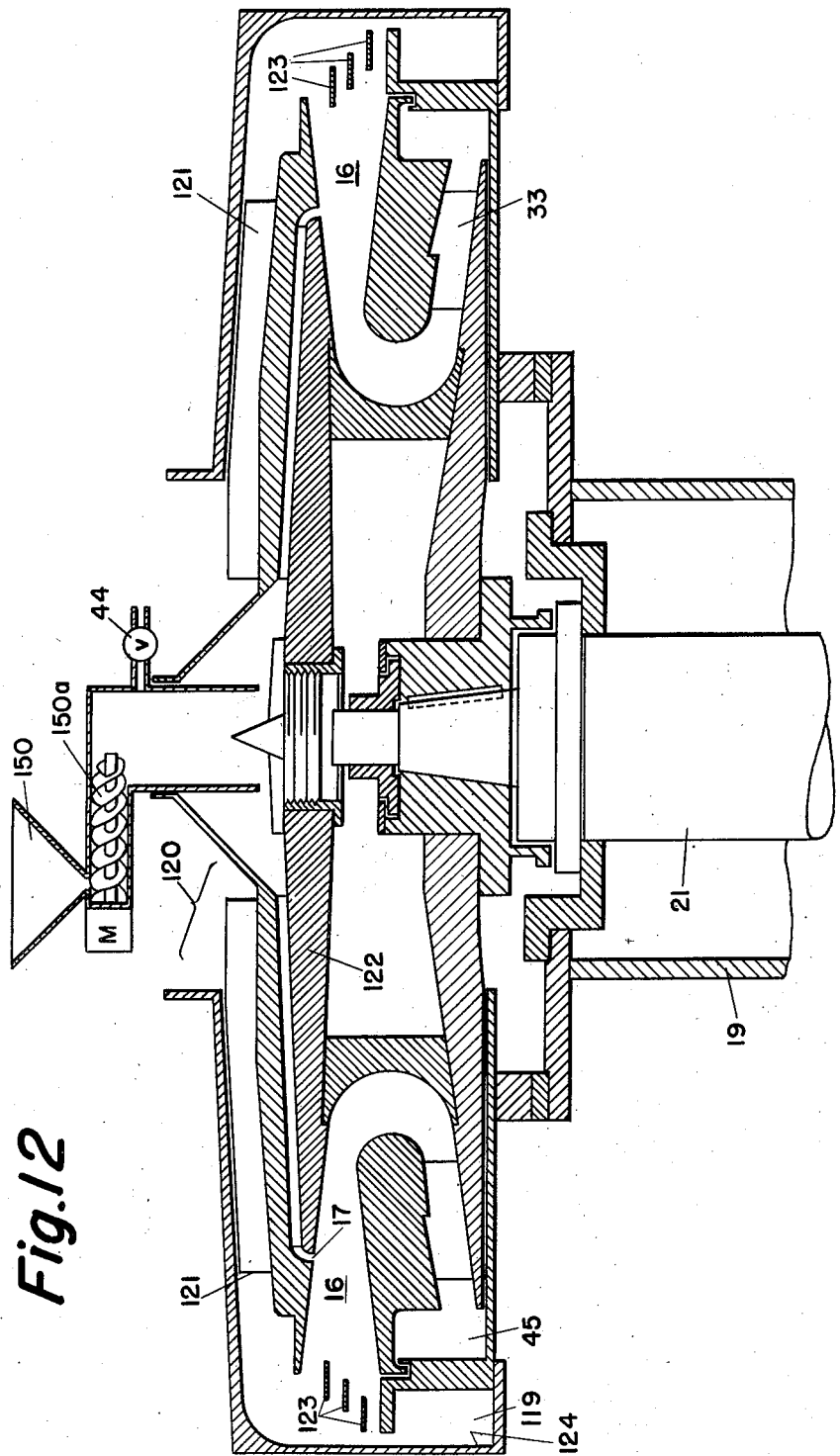
Figure 13:
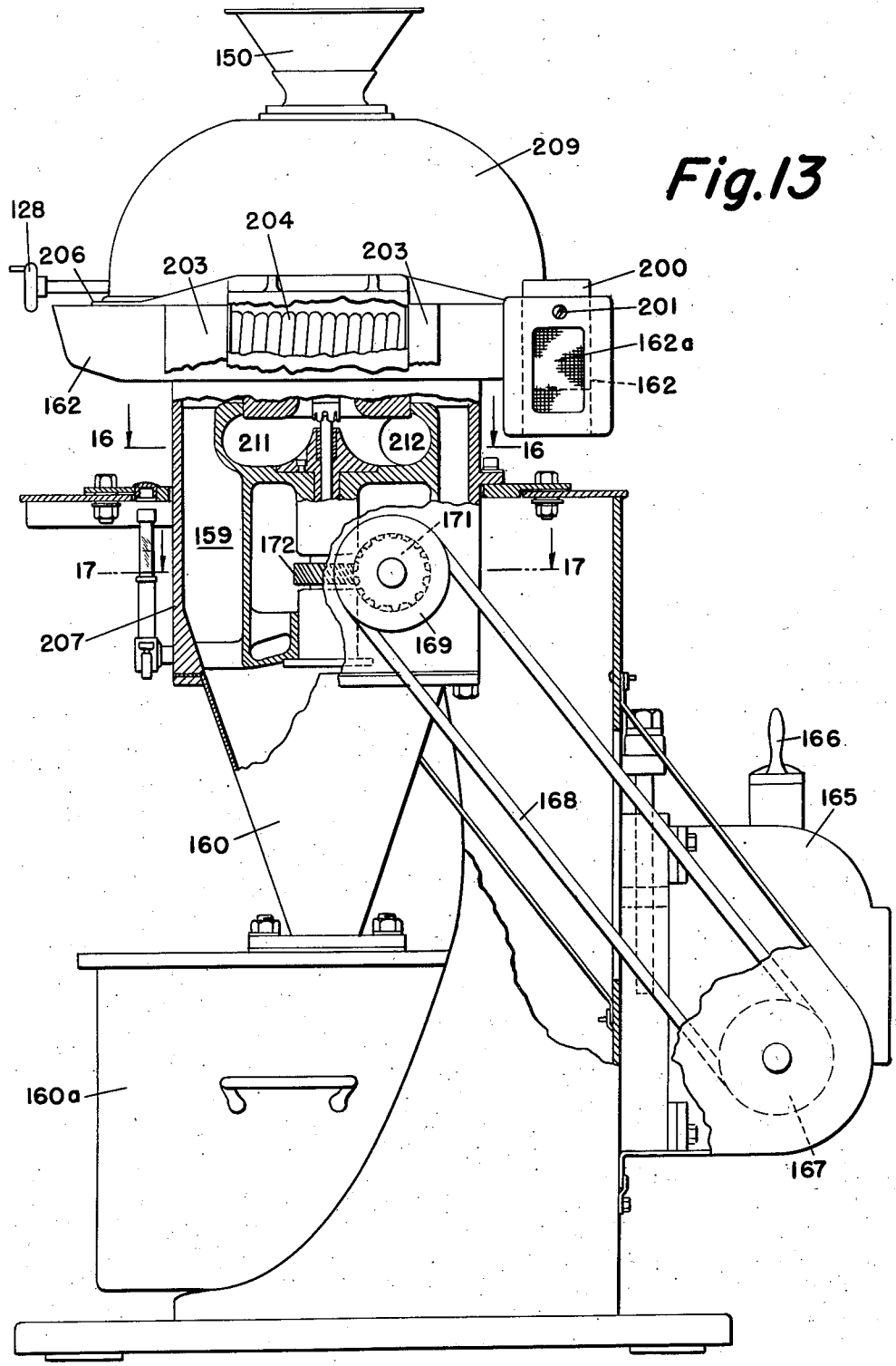
Figure 14:
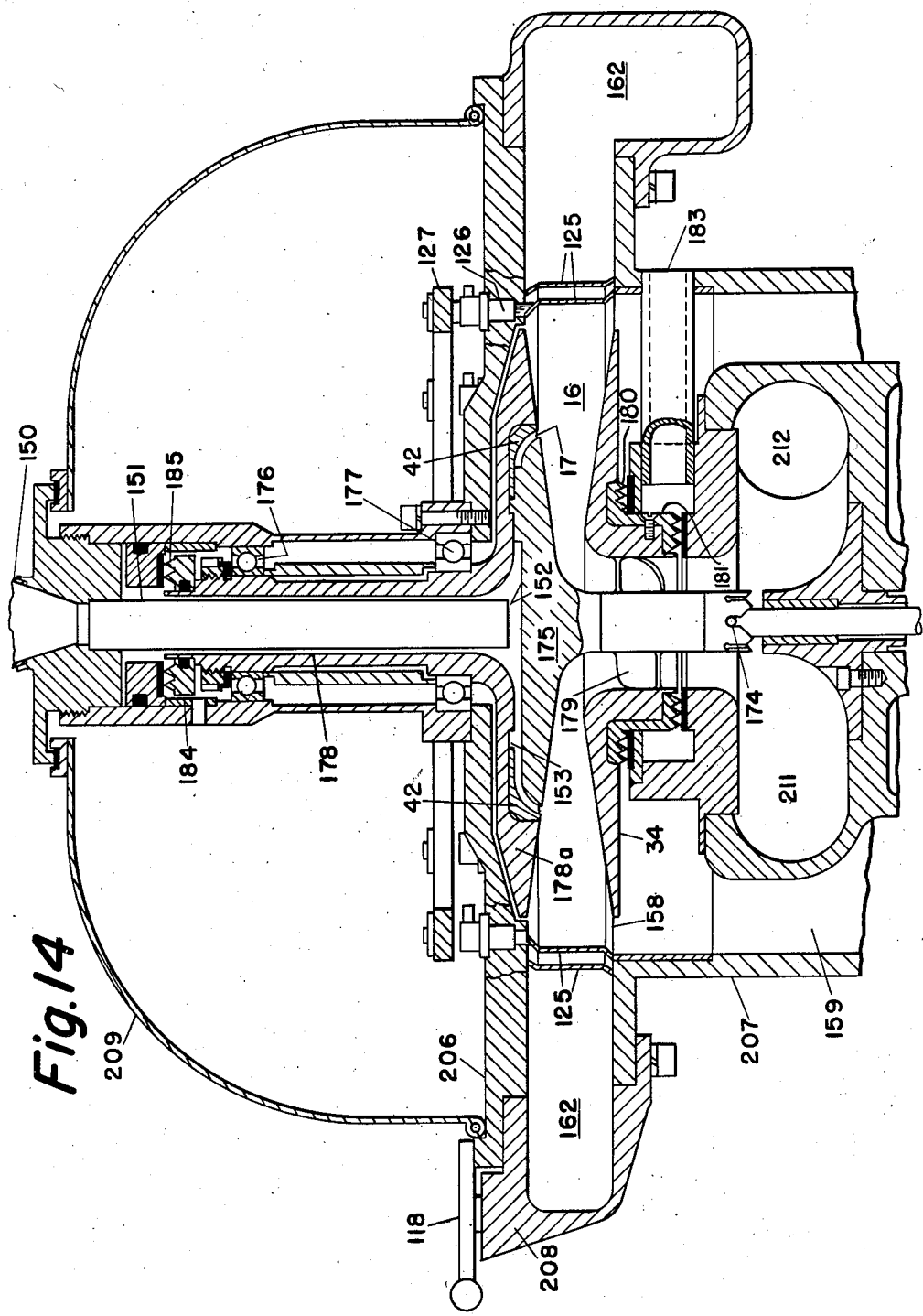
Figure 15:
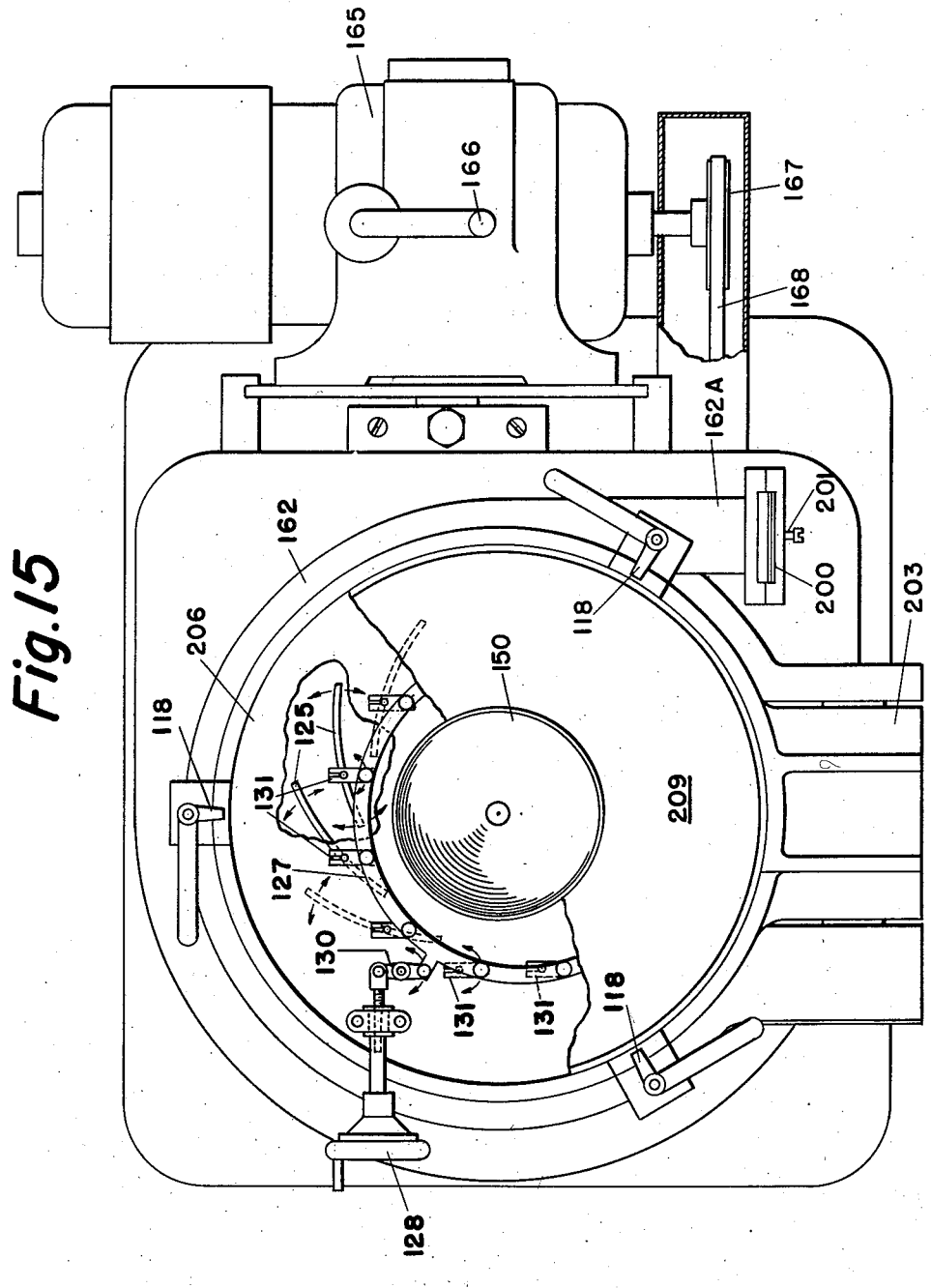
Figure 16:
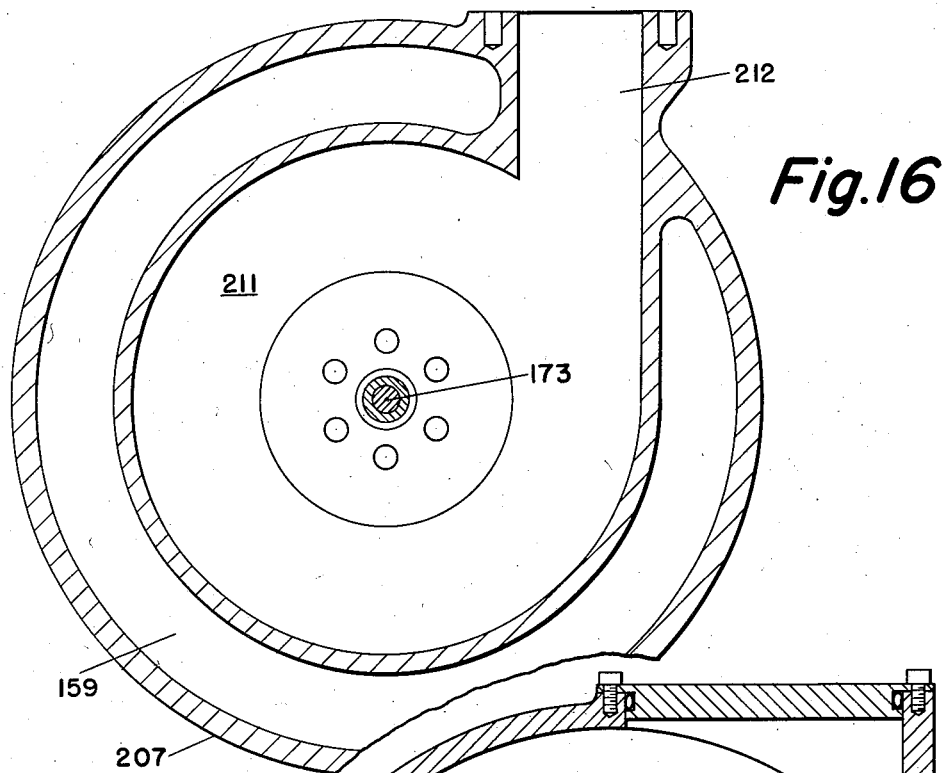

Fig. 9 schematically illustrates the air-directing vanes and includes a plan view of the classifying zone, and also includes labeling corresponding with the terms in a number of the equations hereinafter presented;

Fig. 10 is a sectional view of the left-hand side of the modified classifier;

Fig. 11 is a perspective drawing illustrating the principle of spherical surfaces associated with the air-directing vanes utilized in the modifications of Figs. 1–4 and the modification of Fig. 10;

Fig. 12 is a fractional sectional view of a modified from of the invention;

Fig. 13 is a side elevation partly in section of a further modification of the invention;

Fig. 14 is an enlarged sectional view of Fig. 13 taken in the region of the classifying zone;

Fig. 15 is a plan view with certain parts cut away and certain parts in section of the classifier of Figs. 13 and 14;

Fig. 16 is a sectional view taken on the line 16—16 of Fig. 13; and

Figure 17:
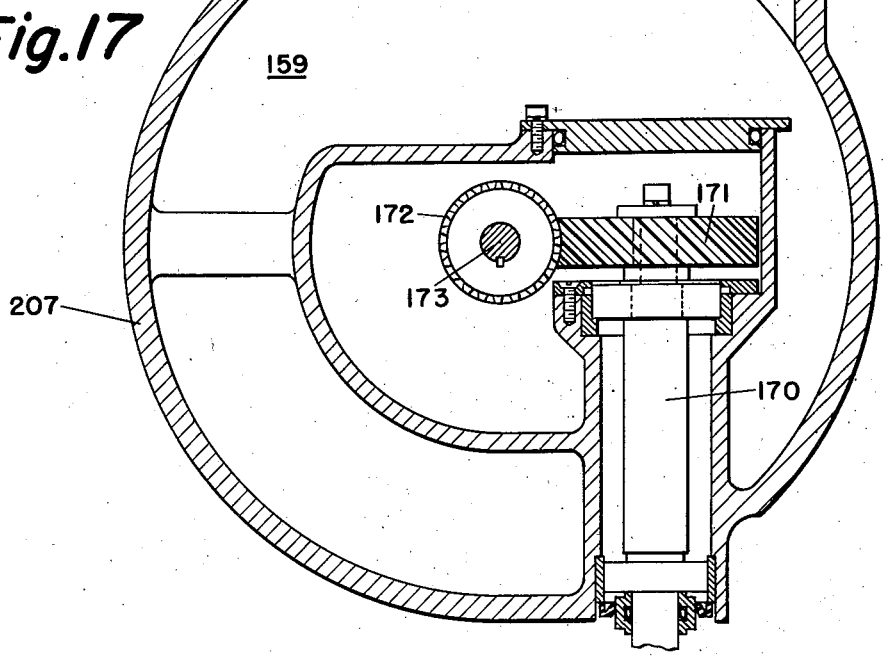

Fig. 17 is a sectional view taken on the line 17—17 of Fig. 13 but enlarged to the same scale as Fig. 16.

Referring to Figs. 1–4, the invention in one form has been shown as applied to a classifier 10 which embodies apparatus aspects of the invention and by means of which the methods thereof may be practiced.

Figure 1:
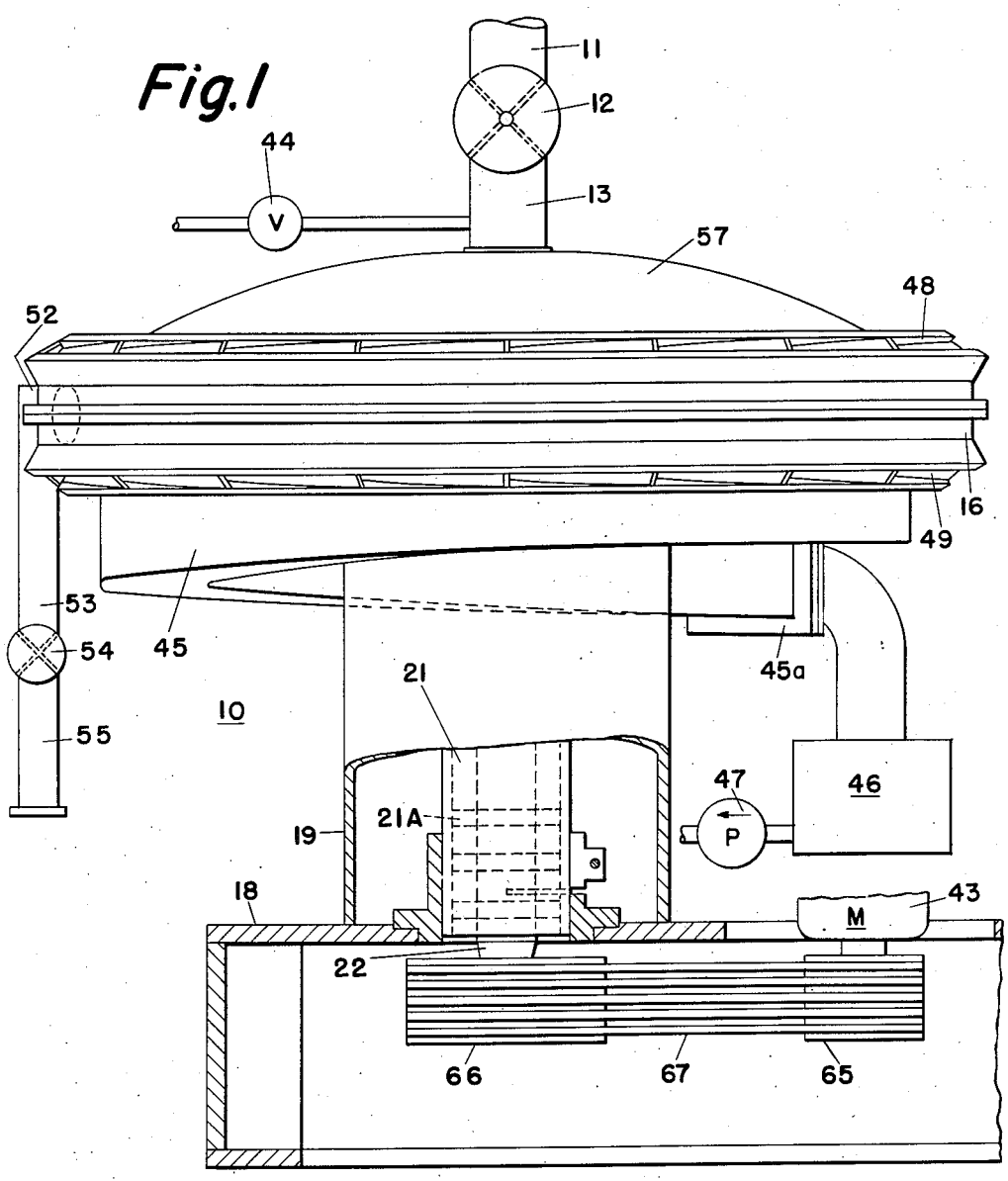
Fig. 1 is a side elevation of a classifier embodying the invention and is partly diagrammatic in the inclusion of several of the auxiliaries.

The classifier 10 as a whole is supported from a suitable base 18 as by the large steel cylinder 19 having welded to the upper portion thereof a supporting flange 20, Fig. 2. In the elevation of Fig. 1, finely divided material from a hopper descends by way of a feed pipe 11 to a material-feeding valve 12 which forms an air seal for delivering material to the feed pipe 13 without admission of air. Air can enter the feed pipe 13 through a valve 44, the amount of air being determined by the setting of the valve. As will be later explained, the finely divided material is separated within the classification zone 16, a coarse fraction being discharged from the classification zone into a discharge pipe 53. From pipe 53, it is delivered to a flanged conduit 55 by way of a material valve 54 which also forms an air seal relative to the classifying zone 16. The valves 12 and 54 are of a conventional design and include a plurality of vanes subdividing the valve chambers into material-compartments. The fine fraction of the finely divided material flows from the classifying zone 16 by way of a stationary scroll 45 to a bag filter 46 in which the finely divided fraction is separated from the air. A suction apparatus, such as a suction fan or pump 47, applies a differential of pressure to the classifier by way of the bag filter and the scroll 45. Accordingly, helical directing vanes 48 and 49 located above and below the classifying zone 16 direct the entering air into rotational flow. The two streams unite at the outer limit of the classifying zone and proceed in free vortex flow therethrough. The walls of the classifying zone are rotated by means of a motor 43 which through pulleys 65 and 66 and belt 67 drives a shaft 22 mounted in a bearing assembly 21. The rotating parts of the classifying zone are enclosed by means of a cover plate 57 secured at its periphery as by a series of cap screws to a part of the stationary member 38.

Referring now more particularly to Figs. 2, 3 and 4, it will be observed that finely divided material from the feed pipe 13 is directed onto a distributing plate 14 of more or less conical shape and which includes a plurality of driving vanes 15. The manner in which the finely divided material is accelerated to a rotational speed equal to that of the free vortex within the separating zone 16, as at the feed point or inlet 17, will be described after a brief description of certain mechanical features of the classifier.

The shaft 22 has an upper tapered end-portion 23 which terminates in a threaded end of reduced diameter. A driving assembly is supported on the conical end 23 of shaft 22 and comprises, Fig. 3, a lower element 24 keyed to the conical end 23 as by the key 25 and the usual keyways. A clamping nut 26 is threaded on the upper end of shaft 22 and presses the lower element 24 downwardly on the tapered end-portion 23 of the shaft 22. An upper driving element 27 is secured to the lower element 24 as by a plurality of bolts 28. The elements 24 and 27 have opposed annular extensions between which is disposed an annular driving member 30. There are provided four steel balls 31 nesting within spherical sockets in the extensions of elements 24 and 27 to provide mechanical interlocking with a minimum of stress due to clamping pressures.

The annular driving member 30 has integrally formed therewith adjacent the outer ends thereof a plurality of supporting elements 32 and a plurality of supporting elements 33 of somewhat greater radial length than elements 32. Supported on the elements 32 and 33 is a member 34, one surface 34a of which is opposed to a surface 35a. The opposed surfaces 34a and 35a form the annular classifying zone 16. A member 35 is rigidly carried by the member 30 as by an annular member 36 which is suitably secured to said members 30 and 35, as by welding or by bolts.

There have not been illustrated fastening bolts or welding beads, it being well understood by those skilled in the art how firmly to connect together the various metal parts. The upper surface 35a of the classifying zone is formed by the lower surface of the member 35 and by the outer end surface of a member 37 which is carried by member 35 being secured thereto by a series of cap screws and overlying a plurality of channels forming a mechanical driving connection with inflowing streams of finely divided material en route to the classifying zone. The inner end of member 37 carries a threaded insert to which is threaded an enclosing bell 68, the upper end of which is disposed between the inner end of the cover 57 and the feed pipe 13. Member 35 is provided with a large central opening into which there is secured as by screws 39 a threaded member 44a. This threaded member is arranged threadedly to receive the distributing cone 14. The member 35 also has milled therein some forty-eight radially disposed slots. The walls between the slots form vanes or driving elements mechanically to engage powder delivered thereto from the distributing cone 14 and its flat extension 14a. To minimize wear, each slot, rectangular in shape, has therein a wear-resisting insert 41, Figs. 3 and 3A, which may be of stainless steel. It may be U-shaped, with or without in-turned ends. The wear-resisting inserts communicate with the inlet 17, the walls 42 of which may be formed of stainless steel, but preferably of tungsten carbide, to provide greater resistance to wear and erosion due to the large quantities of finely divided material to be introduced into the classifying zone 16.

The bearing assembly 21 may take various forms, the one illustrated, Fig. 1, including a thrust bearing assembly 21A for the support of the rotating parts which have just been described.

With the above understanding of the principal mechanical features of the apparatus, reference will again be made to the finely divided material descending through the feed pipe 13 onto the distributing plate or cone 14. With the motor 43 driving the shaft 22 at relatively high speed, it will be understood that finely divided material flowing between the vanes 15 will by centrifugal force move outwardly therefrom and into the multiplicity of radially disposed feed passages 41. As will later be explained, a controlled amount of air is introduced by way of a valve 44 into feed pipe 13, this flow of air sub-dividing among the forty-eight passages. It aids in the flow of the finely divided material into the classifying zone 16. Instead of air, fluid of any kind may be used. For convenience, air will hereafter be used generically to mean fluid.

In accordance with the present invention, the speed of the air in separating zone 16 at the inlet 17 is the same as that of the entering powder. The arrangement is such that within the classifying zone 16 there is established a free vortex, meaning that there is conservation of the angular momentum and that the rotational speed of the air from the outer limit $r_0$ to the inner limit $r_1$ varies inversely with the radius.

The finely divided material entering through the annular inlet 17 and rotating at the same speed as the vortex at the inlet 17 is immediately subjected to two opposing forces. The first is the centrifugal force which tends to move all particles outwardly through the classifying zone 16. The second and opposing force results from the drag on the particles of the radial component of the air flowing inwardly through the classifying zone 16. The magnitude of the centrifugal force $F_c$ relative to the drag force $F_d$ in relation to the vector representative of the tangential velocity is illustrated in Fig. 9. If these forces $F_c$ and $F_d$ be balanced for particles of a given size, then particles below that size will be moved inwardly because the drag force will exceed the centrifugal force for the particles below the cut point. Thus these smaller particles will be moved inwardly beyond the inner limit $r_1$ of the classifying zone and will flow with the air around the curved path between the curved surfaces 36a and 34b, Fig. 3, and thence between the supporting ribs 32 and 33 and into a stationary scroll 45 carried by the supporting plate 20. The scroll 45 terminates in a flanged opening 45a, Fig. 1, to which is attached an outlet pipe leading to a bag filter 46 and a suction pump 47. The suction pump thus produces a differential of pressure between the inlet and outlet of the classifying zone. This differential of pressure produces inward flow of air by way of two groups of directing vanes 48 and 49. These vanes, extending outwardly and about the outer boundary $r_0$ of the classifying zone 16, are individually and preferably simultaneously adjustable in order to control the relative magnitudes of the radial and tangential components of air flow within the classifying zone 16.

As best shown in Fig. 3, one of the upper vanes 48 is pivoted at a mid-portion about an axis of a pivot pin 78 with an end-portion carrying an extension 79a of an eccentric 79 which may be rotated by rotating the upper end 79b thereof after loosening the lock nut. The eccentric 79 causes its extension 79a to rotate the blades about the axis 78 to change the tangential component of the air entering the classifying zone 16. It is to be understood that each directing vane will preferably have an adjusting means for regulating the position thereof relative to the tangent taken on the circle including the series of vanes. While the vanes in the modification of Figs. 1–4 are individually adjustable, they can be simultaneously adjusted, a suitable mechanism therefor being illustrated in the modification of Fig. 13 et seq. It is to be observed that if the axis of the pin 78 be extended, it will intersect the axis of rotation 56.

The opposed surfaces in which the vanes 48 and 49 are disposed are spherical. Thus the edges of the vanes can be rotated along the spherical surface without changing the spacing therebetween in predetermining the tangential component of the air entering the classifying zone 16. The foregoing feature will be explained more fully in connection with similar directing vanes 112 of Figs. 10 and 11.

In the plan view of Fig. 4, the manner in which the vanes 48 are disposed about the classifier 10 is clearly illustrated. It will be observed that the vanes overlap about 50% of their length.

It is to be observed that the classifying zone as a whole is substantially sealed against the ingress of air except by way of the vanes 48 and 49 and through the valve 44. In order to avoid inter-mixture of the fine and coarse fractions, sealing means 75 and 76 are provided, Fig. 3, which comprise knife-edged rings on the lower outer edge of member 34 which ride in fine grooves in sealing material, such as a hardened plastic, carried by a portion of the stationary member 38. Inasmuch as the air pressure is lower to the left of seal 75 and to the right of seal 76, the provision of an air opening 77 between the seals produces flow by way of the seals into classifying zone 16 and into the region opposite the surface 34a to prevent flow of the coarse fraction past the seal 75 and to prevent the flow of the fine fraction by way of seal 76. Thus, the opening 77 causes a flow of air which makes up for any lack of perfect sealing by the seals 75 and 76 and avoids completely the possibility of any inter-mixture as between separated fine and coarse fractions.

The series of vanes 48 and 49 produce rotation of the air with a high tangential component. By providing the Y-shaped structure with divided inlets by way of vanes 48 and 49, a number of advantages are realized. More particularly, a convenient and effective removal of the coarse fraction is made possible. Thus, the particles of larger size moving outwardly under centrifugal force pass between a plurality of annular discs 50. The coarse fraction moves against the spacers 51 and rotates along the inner surfaces of the annular spacers until reaching the mouth 52 of the outlet for the coarse fraction. The structural arrangement is best shown in Fig. 4. While the arrows for the coarse fraction indicate a flow path spaced inwardly of the discs 50, their location has been dictated by minimizing confusion with other parts illustrated. In general, the coarse fractions move between the discs 50 of differing radial width, the widest of the discs 50 extending from the inner surface of the outer wall of the end member 38, which is assembled together in two parts, inwardly to the outer limit of the classifying zone as designated at 50a. As will be more fully explained, the fine fraction moves inwardly of the classifying zone 16, arrows indicating the path thereof. It will be noted, Figs. 3 and 4, that the path of the fine fraction is inwardly of the classifying zone and then downwardly around the curved surface 34b to the exit. This is diagrammatically shown in the plan view of Fig. 4 through the sectional cut-away taken through the member 34.

The coarse particles after passing through the mouth 52 enter a vertical pipe 53. The particles are still rotating within the pipe, and under the influence of gravity descend into an air-sealing valve 54, Fig. 1, provided with rotating vanes for transfer of the heavy fraction into the discharge conduit 55. Air may be exhausted with the coarse fraction to aid its flow as when the cut points required are small.

It will be remembered that the annular discs 50 which form vanes are of decreasing radial dimension, the vane of greatest radial extent being located centrally of the classifying zone. If a line be drawn, Fig. 3, tangent to the outermost corners of each of the vanes 50 on opposite sides of the central vane, it will be observed that the trace of such a line is curved for stream-line flow. The vanes thus serve to produce stream-lined flow of the rotating stream of air produced by the vanes 48 and 49 as it moves into the classifying zone. More particularly, they convert the axial component of velocity into a radial component at the entrance into zone 16. By thus assuring a stream-lined flow from the vanes 48 and 49, there is minimized loss in velocity, possibility of turbulence and other influences tending to decrease the high tangential component produced by vanes 48 and 49. Thus the air entering the outer limit $r_0$ of the classifying zone is rotating at relatively high velocity. As the radius from the axis of rotation 56 decreases, the angular momentum of the rotating body of air is conserved and the velocity increases inversely as the radius increases. With the increasing tangential velocity, the centrifugal force will increase and will be greatest at the inner limit $r_1$ of the classifying zone 16. In order that the drag forces will throughout the classifying zone balance the changing centrifugal force, the opposing annular surfaces 34a and 35a from the outer limit of the classifying zone converge toward each other and in the direction of the inner limit of the classifying zone. Thus the radial component of velocity increases with the decreasing area of the flow path between surfaces 34a and 35a.

In order that there shall be a balance between the centrifugal force and the drag forces throughout the classifying zone 16, in which there is a free vortex, the drag force must vary inversely as the square of the radius from the axis 56.

The following equation sets forth the ideal relationship between the axial spacing $h$ and the distance $r$ from the axis 56 of rotation which will produce the desired variation in the drag force:

$$\frac{h}{r_2} = \frac{h_0}{r_0^2} \quad (1)$$

Paraboloids of revolution satisfy the requirement and may, indeed, be utilized for the surfaces 34a and 35a. However, by providing plane surfaces 34a and 35a which represent chords of the paraboloids, a close approximation to paraboloids is achieved and adequately close to achieve the desired classification of the particles. As a matter of fact, a slight departure from a true paraboloid has an advantage in that there is a slight variation in the balance which in operation tends to prevent holding within the classifying zone particles of cut-point size which theoretically tend neither to move outwardly nor inwardly thereof.

In connection with the spacing of the surfaces 34a and 35a, reference may be had to the Hebb Patent No. 2,616,563. However, it is to be understood that the purpose of the present invention is to utilize a free vortex and not one, as contemplated by Hebb, which may lose tangential velocity by viscous resistance to shear in the vortex; and by interaction with the stationary walls of the classifying chamber and by entry of finely divided material with zero tangential velocity into the central portion of the classifying zone or by entry of such material with the air through the directing vanes.

In order to secure within the classification zone 16 the free vortex flow, there has been eliminated substantially all of the interaction forces tending to slow down or to speed up the free vortex flow, such for example, as the effect due to the boundary walls, the adjoining vortex layers, and the powder undergoing classification. It will be remembered that the boundary walls 34a and 35a are rotated by suitably driving the shaft 22 in order to eliminate frictional drag on the free vortex flow.

With respect to the adjoining vortex layers, consideration will now be given to the shear rate. The shear rate is proportional to the viscous shearing forces between layers. With a fixed separation of the surfaces 34a and 35a, the shear rate decreases rapidly outwardly from the center of the free vortex. This fact will now be considered from the mathematical standpoint. It will be remembered that the equation for a free vortex is:

$$v_t = \frac{k}{r} \quad (2)$$

where $k$ is a constant.

The shear rate is given by the equation:

$$\frac{dv_t}{dr} = -\frac{k}{r^2} = -\frac{v_t}{r} \quad (3)$$

An inspection of Equation 3 makes self-evident the fact that the shear rate increases as $r$ decreases. Accordingly, by making $r$ fairly large, the shear rate is greatly reduced.

Referring now to Fig. 5, there has been plotted a curve 60 with the radius as abscissae and the tangential velocity $v_t$ as ordinates. The curve 60 shows the change in tangential velocity for a free vortex with change of radius. Due to the increase in the shear rate as the radius is decreased, there is not attained the velocity $v_t$ as the radius becomes small, and the change in the tangential velocity of the vortex follows the broken line curve 61. Accordingly, the classification zone is spaced outwardly from the axis of rotation 56 in order to assure the conditions for a free vortex.

More particularly, if $\Delta r$ be taken as the radial width of the classifying zone, i. e., $r_0 - r_i$; and if $r_f$ be taken as the radius from axis 56 to the feed point 17, it can be shown that $$\frac{\Delta r}{r_f}$$

is a factor which may be taken as a measure of the excellence of free vortex flow. That factor or ratio provides a mathematical statement of the location of the classifying zone outwardly of the axis of rotation. While in the preferred form of the invention, the factor of $$\frac{\Delta r}{r_f}$$

is preferably about 0.4, very superior results will be achieved with values thereof ranging from 0.2 to 0.9.

Referring to Fig. 6, the curve 62 is similar to the curve 60 of Fig. 5, being plotted against the same units for abscissae and ordinates. In Fig. 6 a classifying zone A has been illustrated as having an inner limit of $r_{ia}$, an outer limit of $r_{oa}$. The introduction of finely divided material at the feed point occurs at an intermediate radius $r_{fa}$. For such a classifying zone, the optimum speed of rotation of the boundary surfaces 34a and 35a will be one matching at the feed point the tangential velocity $v_t$ of the free vortex. Accordingly, there may be drawn from the origin the straight line 63. This line or graph 63, while matching the tangential velocity $v_t$ at the point $r_{fa}$ of the free vortex, at other points greatly departs from the tangential velocity of the vortex, being much higher at the outer limit $r_{oa}$ and much lower at the inner limit $r_{ia}$. With such a classifier, there will be of necessity interchange of energy between the layers of air of the vortex adjacent the boundary surfaces 34a and 35a at all points other than the feed point 17.

Referring now to a classification zone in accordance with a further aspect of the present invention and designated at B, it will be observed that the inner limit of the classifying zone $r_i$ appears along the flat portion of the graph 62, with the feed point $r_f$ intermediate the inner limit $r_i$ and the outer limit $r_o$. For the classification zone B, the speed of the surfaces 34a and 35a should be equal at the feed point $r_f$ to that of the free vortex. Accordingly, the graph 64 in the form of a straight line from the origin through the point $r_f$ may be drawn, only that fraction of that line passing through the classification zone B being shown. It is to be observed that the tangential velocity of the surfaces 34a and 35a closely approaches that of the free vortex throughout the classification zone. Accordingly, there will be but little, an inconsequential, interchange of energy in any part of the classification zone due to a difference in the tangential velocity between said surfaces 34a and 35a and the air and the finely divided material in the free vortex.

It may be observed that for the classification zone A, the ratio $$\frac{\Delta r}{r_f} = 1.33$$

whereas for the zone B, $$\frac{\Delta r}{r_f} = 0.4$$

Consideration of Figs. 5 and 6 makes self-evident the fact that not only is the shear rate maintained low and the free vortex flow maintained for a classification zone in the region of B of Fig. 6, but also the effect of the plates on the free vortex can be substantially eliminated by locating the classification zone at a substantial distance from the axis of rotation. Thus, both factors are substantially eliminated by a similar or substantially like location of the classification zone.

The foregoing may be stated differently by saying that $r_o$, the radius to the outer limit of the classification zone, should be large. In addition, in order that an almost perfect free vortex can be maintained, the ratio of $r_o$ to $r_1$ should be maintained small. In considering these various factors, two very surprising results were discovered. First, it was found that for any given machine and a selected cut point, the ratio of the pressure drop across the classifier to the powder-handling capacity of the machine is least for a ratio of $r_o$ to $r_1$ of about 1.5. This will not be shown.

The powder handling capacity of a given machine is proportional to the volume of air flowing through the machine per unit time, Q. A pressure differential across the machine, $\Delta p$, is required to create the volume velocity, Q, and is proportional to the energy delivered by the suction fan. Consequently more economical classification can be achieved if $\Delta p/Q$ can be reduced. In Fig. 7, the quantity $$\frac{\Delta p}{Q}$$

has been plotted as ordinates against the ratio $$\frac{r_o}{r_1}$$

as abscissae. From Fig. 7 it will be seen that the zone of reasonably economical performance is from $$\frac{r_o}{r_i}=1.2 \text{ to } \frac{r_o}{r_i}=2.7$$

Inasmuch as these values of $$\frac{r_o}{r_1}$$

correspond with values of $$\frac{\Delta r}{r_t}$$

from approximately 0.1 to 1.0, it will be seen again that the small ratio of $$\frac{\Delta p}{Q}$$

occurs in the same desirable range for $$\frac{r_o}{r_1}$$

and in the same desirable range for $$\frac{\Delta r}{r_t}$$

necessary for best operation of the classifier.

The second surprising fact discovered in connection with the present invention is that the material or powder-handling capacity of the classifier does not increase as its radial width is increased. More particularly, the classifying zone with $$\frac{r_o}{r_1}$$

equal to 5 will have about the same powder-handling capacity as the classifier with $$\frac{r_o}{r_1}$$

equal to 1.5.

In constructing a classifier embodying the present invention, it will be useful to maintain the quantity $$\frac{\Delta r}{h_o}$$

between the limits of about 1.3 to about 4.0. While the selection of this ratio, between the radial width of the classifying zone with respect to the axial height of the zone at the outer limit, is specified as a result of a number of considerations, it will be adequate for the present disclosure to set forth the empirical range just stated. The preferred range for $$\frac{\Delta r}{h_o}$$

is from 2 to 3, the value of 2.67 being somewhat superior.

It may be further observed that the capacity of the machine may be increased by increasing $r_o$. Since the capacity of the machine theoretically increases as the cube of $r_o$, and a classifier with a capacity of 10 tons per hour of finely divided material has a radius, $r_o$ equal to about 20", a classifier for 5 tons per hour may have a radius $r_o$ of about 16 inches.

In a typical embodiment of the invention as illustrated in Figs. 1–4, $r_o$ had the previously given value of 20"; $r_1$ had a value of about 13¼", with $r_t$ half-way between $r_1$ and $r_o$; $h_o$ had a value of 2½" and $h_i$ had a value of 1⅛". Between the curved surfaces 34b and 36a, the spacing gradually increases from about 1⅛" to a value of approximately 2 inches. The increase in the cross-sectional area for the flow of the air in mixture with the fine fraction from the $r_1$ to the entrance into the scroll 45 is effective to convert velocity into pressure and is effective in minimizing the pressure drop from inlet at the mouths of the directing vanes 48 and 49 to the outlet at the suction fan. This feature, of course, is advantageous in reducing the size of the fan and driving motor for a given flow of air.

The foregoing can be viewed in a different way. After the fine fraction in mixture with the air in free vortex flow passes through the classifying zone, and after traversing the curved surfaces forming the reversal in flow path, it will be seen that the vortex is outwardly flowing. From the standpoint of the conservation of angular momentum, there will be progressive decrease in the tangential velocity as the radius increases.

If the cut point is to be reduced to increase the fineness of the particles carried by the air inwardly through the classifying zone, the rotational speed of the air and of the particles may be increased. This can be readily accomplished by changing the direction of the curved vanes 48 and 49 to direct the air into the outer boundary of the classifying zone in reduction of the ratio of the radial component to the tangential component. Inasmuch as this increases the rotational speed of the air at the other limit of the classifying zone for a fixed volume of air flow, it is necessary or highly desirable to increase the speed of the shaft 22 to a point where the finely divided material is positively driven to have a tangential velocity equal to the tangential velocity of air at the feed point 17.

Though the motor may be of the variable speed type in order easily to change the speed of shaft 22, in many cases it will be more desirable to provide a Reeves drive between the driving pulley and the motor, the Reeves drive or other speed-changing device providing for adjustment of the speed of the shaft 22.

In this connection, a tachometer is preferably utilized to measure the speed of the shaft 22. The exact speed desired will then be determined in relation to the setting of the curved directing vanes 48, 49. The relationship between the speed of shaft 22 and the setting of the directing vanes 48 and 49 may be readily determined by measuring the speed of air in true vortex flow within the zone 16 for the various settings of the vanes 48 and 49. With the tangential velocity of the air at feed point 17 known, the shaft 22 is then rotated at a speed to bring the powder entering through the inlet 17 to the same tangential velocity.

If it is desired to increase the cut point to decrease the fineness of the particles carried inwardly through the classifying zone, the reverse procedures are utilized. The vanes 48 and 49 are moved to increase the ratio of the radial component to the tangential component. By thus increasing the drag force relative to the centrifugal force, particles of sizes greater than before move inwardly through the classifying zone 16. A corresponding change in the speed of shaft 22 is, of course, made. It will be seen that by varying the ratio of the tangential component to the radial component of the air entering the classifying zone, the cut point may be selected over a wide range, for example, from about 3 microns upwardly to as high as 100 microns for finely divided material having a specific gravity of around 3.0.

For each setting of the vanes 48 and 49, the speed of the shaft 22 is again adjusted to equalize the tangential velocity of the entering finely divided material and the tangential velocity of the free vortex flow at point 17.

A further surprising result achieved with the present invention is the fact that there is maintained within the classifying zone 16 a free vortex flow unimpaired by the boundary walls which otherwise would materially affect, retard or accelerate the vortical flow. There is maintained a free vortex flow unimpaired by the rate of feed of powder or finely divided material into it. This is a most surprising result and one which is believed to have been achieved for the first time in accordance with the present invention. More particularly, any factor which tends to change the free vortex flow acts cumulatively and continues to cause departure from a true vortex flow. It is only by reducing each and every such factor to a negligible value that a true vortex flow can be maintained.

A further surprising result has been the greatly increased efficiency of classification. Efficiencies of 80% to 90% at full through-put capacity may be expected in accordance with the present invention, efficiencies more than twice that heretofore achieved at full through-put capacity. With conventional machines operating at rated capacity, the classification efficiencies are of the order of 30%. Such efficiencies are determined as outlined by Newton in the periodical "Rock Products," 1932, vol. 35, page 26. Consider the actual example of a classifier with a 30% classification efficiency. The feed material contained 74% by weight of material below the cut point; consequently 22% of the original feed material was discharged in the fine fraction and 78% was returned to the mill. This means that only 22% of a new feed material could be introduced to the mill while 78% had to be recycled from the classifier. Accordingly, a circulating load of 3.54 times the rate of feed of new material must be maintained through the mill. With a classification efficiency of 85%, the circulating load will be reduced to around 0.59. Thus, in accordance with the present invention, the production capacity may be increased by a factor of 2.8 with the same total loading of the mill; it follows that for the same production capacity, the mill loading may be greatly reduced. Those skilled in the art will understand that the type of mill used will be selected in terms of the character of the finely divided material to be classified. Inasmuch as these grinding mills are in general expensive and have high requirements in terms of horse power to drive them, the significance of the foregoing decrease in the circulating load of the grinding mill will be more fully appreciated.

Figure 8:
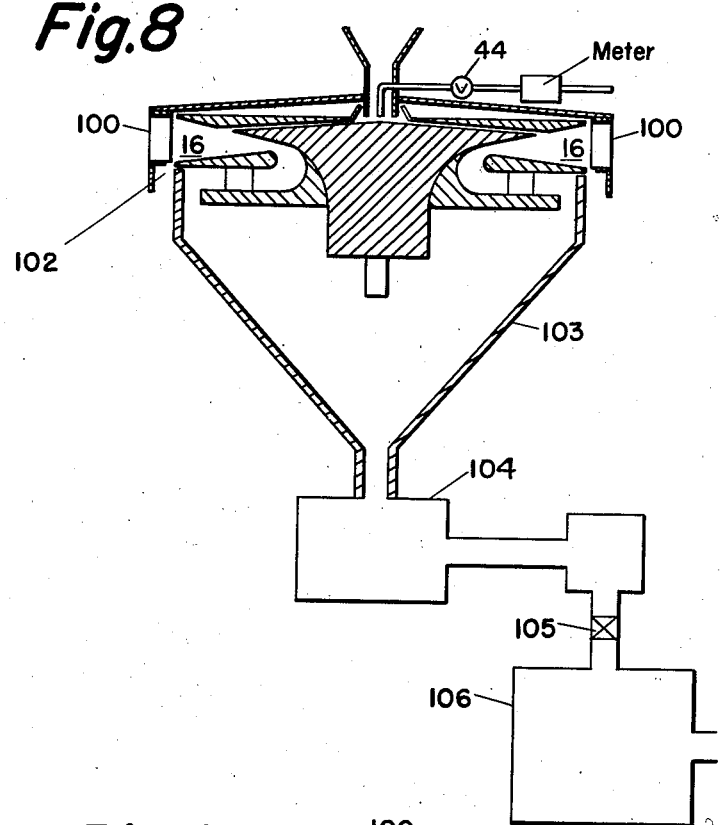
Fig. 8 is a sectional view of a modification of the invention.

Referring now to Fig. 8, there is disclosed a classifier along the lines of Figs. 1–4. However, spiral directing vanes 100 are located opposite the outer limit of the classifying zone. Coarser particles moving outwardly of the classifying zone 16 engage and move along the vanes 100. The particles also move downwardly under the influence of gravity and exit through the opening 102. By means of a shroud, omitted from Fig. 8, they may be gathered and continuously fed into a stationary collector. The fine fraction moves inwardly of the classifying zone 16 with the inward flowing air and are collected within the relatively large vessel formed by the conical walls 103. The fine fraction descends into the collector chamber 104. If desired, a valve 105 may be included in the inlet to the suction fan 106.

Fig. 9 illustrates diagrammatically the arrangement of the vanes 100 of the modification of Fig. 8.

In Fig. 10, only the left-half side of a modified classifier is illustrated. The classifying zone 16 has at the outer limit thereof a plurality of discs 110 which aid in transforming the air entering through a plurality of directing vanes 112 into tangential flow within the entrance to the classifying zone 16. The directing vanes 112 are disposed within walls 113 and 114 having spherical surfaces with radii such as R. Fig. 11 illustrates surface 114 as an entire sphere, the better to illustrate the spherical shape of surface 114 of Fig. 10. In consequence, as the directing vanes 112 are rotated about R taken as their axis of rotation, the spacing of the vanes 112 from the walls 113 and 114 at every point and for any amount of rotation will remain constant and unchanged. Accordingly, with this feature complete adjustability is provided for the directing vanes 112. It will be desirable to include the aforesaid feature in the Y-arrangement of Figs. 1–4. Having provided the concentric spherical surfaces, as also shown in Fig. 9, it will be seen that the vanes also may be bodily moved lengthwise to change the tangential velocity of the air at the entrance to the classifying zone.

In Fig. 12, the arrangement is such that there is automatic matching of the tangential components of the vortex velocity to the speed of the rotating plates at the inlet 17 for the finely divided material from conveyor 150a. In this modification of the invention, air enters by way of the annular inlet 120 and is accelerated by a plurality of vanes 121 carried by the upper member or plate 122 of the classifying zone. It will be observed that the vanes 121 extend outwardly a distance just beyond the inlet 17 to the classifying zone 16. The reason they extend slightly beyond feed point 17 is to provide slightly greater tangential components to the air as it leaves the vanes 121 than is imparted to the powder as it enters the classifying zone 16. Thus, as the air in streamlined flow is turned or guided by a plurality of vanes 123 into the classifying zone 16, any decrease in its tangential velocity due to turning the corner will be compensated for by the slightly increased tangential velocity it had when leaving the vanes 121. Thereafter, in conservation of its angular momentum, when it arrives at the feed point 17, its tangential velocity to a close approximation will be equal to that of the powder entering through the feed point 17. Again it will be observed that the coarse powder will move freely through the directing elements 123 and will descend by gravity along the enclosing wall 124 and into a scroll 119 from which it is continuously removed from the classifier, as in Figs. 1–4. The inwardly flowing air and the fine fraction move into a scroll 45, such as illustrated in the modification of Figs. 1 and 2. Inasmuch as the rotating plates determine both the powder velocity at the powder feed radius and the main vortex velocity, it will be seen that in this modification the critical velocities remain automatically matched at any plate speed over a relatively wide range of cut points.

In the modification of Figs. 13–17, further aspects of the invention have been illustrated. In this connection, it is to be understood that features illustrated in connection with one modification may be utilized in other modifications without departing from the invention. For example, in the modification of Figs. 13–17, the classifying zone 16, Fig. 14, is illustrated with the directing vanes 125 located opposite the outer limit of the classifying zone. These plates or vanes are respectively mounted on pivot pins 126 and have extensions operatively connected to a ring 127 which may be laterally displaced by means of the rotation of the adjusting wheel 128, Fig. 15. Upon rotation of wheel 128, a link 130 is rotated to move the ring 127 laterally to rotate each of the arms 131 carried thereby to rotate each of the vanes 125 through the same angle. It will be understood there are a multiplicity of such arms attached to the ring 127 and extending circumferentially of the annular classifying zone 16.

In the modification of Figs. 13–17, the powder is fed downwardly from a hopper 150, Fig. 14, through a feed pipe 151 and onto a distributor plate 152. The powder is thrown outwardly by centrifugal force and is engaged by a plurality of vanes or driving elements 153 positively to drive the powder up to a speed such that its tangential velocity as it enters the feed inlet 17 is equal to the tangential velocity of the free vortex flow within zone 16.

The coarse fraction moves outwardly of the classification zone, engaging the inner surfaces of the vanes 125 and descending by gravity through the opening 158 and descending downwardly through the channel 159 and into the conical hopper 160, Fig. 13, and thence into receptacle 160a. The fine fraction moves inwardly through the classifying zone and into the collecting scroll 211 and outwardly thereof through the pipe 212 as shown in Figs. 13 and 16.

In the preferred form of the invention, the classifying zone 16 is located outwardly from the position shown in Figs. 13 and 14. However, it has been illustrated as fairly close to the axis of rotation to illustrate the fact that some features of the invention may be utilized with improved results.

In the modifications of Figs. 13–17, the relative parts of the classifier are driven through a variable speed drive 165, Fig. 13, provided with an adjusting crank 166 to change the speed of a driving pulley 167. The belt 168 from pulley 167 drives a pulley 169 mounted on a shaft 170 which extends inwardly of the lowermost portion of the stationary casting. As shown in Fig. 17, shaft 170 is mounted in bearings in the frame member or casting 207 and carries a gear 171 driving a gear 172 secured to a vertical shaft 173. At the upper end of shaft 173 there is a cross-pin 174, Fig. 14, resting in a pair of driving recesses, carried by the lower end of the rotating member 175. The rotatable portion of the classifier has bearing supports 176 and 177 for a tubular member 178 concentrically located relative to the feed pipe 151. The member 178 has a radially extending portion 178a, the lower surface of which forms a part of the classifying zone. The member 175 and the member 178 are rigidly interconnected, notwithstanding the presence of the material-driving channels including the driving elements 153. Thus, the member 175 is journaled by the bearings 176 and 177. The lower member 34 of the classifying zone is secured to member 175 by a series of radially disposed elements 179. Seals 180 and 181 are provided to prevent mixture of the fine and coarse fractions. Air inlets 183 are provided intermediate each pair of seals for the purposes described in connection with the modification of Figs. 1–4, only one of them being shown in Fig. 14. A similar seal 184 is provided at the upper end of the member 178. Thus, the classifying zone 16 is subjected to a differential of pressure applied by way of the scroll 211, details of which are shown in Figs. 15 and 16.

The scroll 162, Figs. 14 and 15, terminates in an entrance portion 162a closed by an adjustable valve 200 shown in the form of a sliding member which may be held in any adjusted position by a lock screw 201. Thus, air entering through the valve 200, which preferably includes a screen, is fed from the scroll 162 into the inlet portions of the vanes 125 by which it is given the rotary motion and is brought up to the desired speed for entry into the classification zone 16.

In the present modification, access to the working parts is achieved by hingedly mounting the classifier assembly as at 203, a spring 204, Fig. 13, being provided to take the weight of the hinged portion as it is moved to the open position.

The hinged classifier section is securely held in operating position as by three hold-down latches 118, Figs. 14 and 15, these latches bearing against the upper plate 206 carried by the main frame member 207 by way of the casting 208 forming a part of the scroll 162. A cover 209 encloses the upper portion of the classifier.

It is again emphasized that the present invention in its preferred form provides a free vortex flow throughout the classification zone undisturbed by any factors. It is again emphasized that even a small disturbance acts cumulatively, and, hence, causes material departure from the free vortex flow which is considered prerequisite to high through-put and high classification efficiency with cut points ranging below 20 and 30 microns. By "cut point" is meant the top size of the particles comprising the fine fraction. Cut point may be defined in a different way, namely, in terms of a particle size which within the classification zone will have an equal tendency to move inwardly and outwardly thereof. Theoretically, particles of such size would divide equally as between the fine fraction and the coarse fraction. By adjustment of the cut point, say at 5 microns, the finely divided material will be divided into two streams or fractions, the fine fraction containing particle sizes ranging below 5 microns and the coarse fraction containing particle sizes ranging above 5 microns.

What is claimed is:

1. A classifier in which finely divided material and air in free vortex flow pass through an annular classifying zone in obedience to the law of conservation of angular momentum with an increasing tangential velocity from the outer boundary to the inner boundary of said zone for classifying the material on the basis of size and density, comprising two walls having opposed surfaces of revolution with the axial distance therebetween progressively increasing outwardly from an inner radial boundary to an outer radial boundary to form said annular classifying zone, an outlet conduit having an annular entrance communicating with said inner radial boundary of said classifying zone, means for producing a differential of pressure as between said outer boundary of said classifying zone and said conduit for flow of air into said classifying zone, directing means included in the path of inflowing air for producing between said opposed surfaces and within said zone an inwardly spiraling vortex, one of said walls intermediate said inner and outer boundaries having a material access entrance, means for feeding said finely divided material into said access entrance and for rotating said finely divided material at a speed substantially equal to that of the vortex at the location of said access entrance, means for rotating the walls of said classifying zone at a speed at which said access entrance approximately equals the speed of said vortex at the location of said access entrance, said classifying zone being spaced outwardly from the common axis of rotation a distance such that the speed of said surfaces both at the inner and outer boundaries thereof closely approximate the tangential velocity of said vortex at said inner and outer boundaries, said walls converging from said outer boundary toward said inner boundary at a rate which increases the drag force of the radial flow of air upon the finely divided material at a rate which closely approximates the rate at which the centrifugal force increases for continuous flow of a fine fraction of the finely divided material from said classifying zone into and through said conduit, and an outlet passage communicating with the outer boundary of said classifying zone for continuous flow from said zone into a stationary collector of a coarse fraction of said finely divided material.

2. The classifier of claim 1 in which said feeding means includes driving elements for positively driving the finely divided material at an increasing speed to produce equality as between the tangential velocity of the material entering the classifying zone and the tangential velocity of the vortex at said access entrance.

3. The classifier of claim 2 in which said driving elements are radially disposed about one of said walls to form a plurality of channels with inlets near said common axis of rotation and with outlets coinciding with said material access entrance into said classifying zone.

4. The classifier of claim 3 in which said channels are provided with wear-resisting liners on the trailing wall thereof to resist abrasion by the finely divided material.

5. The classifier of claim 1 in which there are provided circumferentially of said outer boundary of said classifying zone a plurality of directing vanes each extending outwardly from the outer diameter of said zone, and means for adjusting said vanes to change their pitch relative to said outer boundary to change the tangential velocity of said vortex.

6. An apparatus in which finely divided material and air in free vortex flow pass through an annular classifying zone in obedience to the law of conservation of angular momentum with an increasing tangential velocity from the outer boundary to the inner boundary of said zone for classifying the material on the basis of size and density, comprising two walls having opposed surfaces of revolution with the axial distance therebetween progressively increasing outwardly from an inner radial boundary to an outer radial boundary to form said annular classifying zone, means including directing vanes disposed adjacent the outer boundary of said classifying zone and extending outwardly therefrom for producing between said opposed surfaces and within said zone an inwardly spiraling vortex, one of said walls intermediate said inner and outer boundaries having a material feeding inlet for finely divided material, means for feeding said finely divided material into said inlet and for rotating said material to bring its tangential velocity equal to that of the vortex at the location of said inlet, said classification zone being characterized by a radial width $\Delta_r$ which bears a ratio to the radius of $r_t$ from the axis of rotation to said inlet ranging from 0.2 to 0.9, means for rotating the walls of said classifying zone at a speed at which said annular inlet approximately equals the speed of said vortex at the location of said inlet, an outlet passage communicating with the inner boundary of said classifying zone for flow from said zone of air and a fine fraction of the finely divided material, and an outlet passage communicating with the outer boundary of said classifying zone for continuous flow therefrom of a coarse fraction of said finely divided material.

7. The classifier of claim 6 in which said means for rotating said finely divided material includes a plurality of feed channels rotatable with said walls of said classifying zone, each of said channels being provided with wear-resisting liners on the trailing wall thereof, and said inlet having an insert of wear-resisting material within the region where said finely divided material enters said classifying zone.

8. The classifier of claim 6 in which the ratio of $\Delta_r$ with respect to the axial spacing of the walls of said classifying zone at the outer limit thereof ranges from 1.3 to 4.0.

9. The classifier of claim 6 in which the ratio of the radius at the outer limit of the classifying zone to the radius at the inner limit of the classifying zone ranges from 1.2 to 2.7.

10. A classifier for finely divided material comprising two walls having opposed surfaces of revolution with the axial distance therebetween progressively increasing outwardly from an inner radial boundary $r_1$ to an outer radial boundary $r_0$ to form an annular classifying zone, means including directing vanes extending outwardly and about said outer boundary zone for producing at the outer boundary of said classifying zone an inwardly spiraling vortex, one of said walls intermediate said inner and outer boundaries having an inlet for the finely divided material, means in flow connection with said inlet and including rotating driving elements for positively driving said finely divided material to increase its speed until its tangential velocity as it enters said inlet is equal to that of said vortex at the location of said inlet, the ratio $\Delta_r$ relative to the axial spacing between said walls at the outer limit of said classifying zone between about 1.3 and 4, and the ratio of $r_0$ to $r_1$ is between about 1.2 to 2.7, where $\Delta_r$ is the radial width of said classifying zone.

11. A classifier for finely divided material comprising two walls having opposed surfaces of revolution with the axial distance therebetween progressively increasing outwardly from an inner radial boundary $r_1$ to an outer radial boundary $r_0$ to form an annular classifying zone, means including directing vanes extending outwardly and about said outer boundary zone for producing at the outer boundary of said classifying zone an inwardly spiraling vortex, one of said walls intermediate said inner and outer boundaries having an inlet for the finely divided material, means in flow connection with said inlet and including rotating driving elements for positively driving said finely divided material to increase its speed until its tangential velocity as it enters said inlet is equal to that of said vortex at the location of said inlet, the ratio $\Delta_r$ relative to the axial spacing between said walls at the outer limit of said classifying zone between about 1.3 and 4, and the ratio of $r_0$ to $r_1$ being about 1.5, where $\Delta_r$ is the radial width of said classifying zone.

12. A classifier for finely divided material comprising two walls having opposed surfaces of revolution with the axial distance therebetween progressively increasing outwardly from an inner radial boundary $r_1$ to an outer radial boundary $r_0$ to form an annular classifying zone, means including directing vanes extending outwardly and about said outer boundary zone for producing at the outer boundary of said classifying zone an inwardly spiraling vortex, one of said walls intermediate said inner and outer boundaries having an inlet for the finely divided material, means in flow connection with said inlet and including rotating driving elements for positively driving said finely divided material to increase its speed until its tangential velocity as it enters said inlet is equal to that of said vortex at the location of said inlet, the ratio $\Delta_r$ relative to the axial spacing between said walls at the outer limit of said classifying zone being of the order of 2.67, and the ratio of $r_0$ to $r_1$ of about 1.5, where $\Delta_r$ is the radial width of said classifying zone.

13. A classifier for finely divided material comprising two walls having opposed surfaces of revolution with the axial distance therebetween progressively increasing outwardly from an inner radial boundary $r_1$ to an outer radial boundary $r_0$ to form an unobstructed annular classifying zone, means including directing vanes extending outwardly and about said outer boundary zone for producing at the outer boundary of said classifying zone an inwardly spiraling free vortex, one of said walls intermediate said inner and outer boundaries having an inlet for the finely divided material, means in flow connection with said inlet and including rotating driving elements for positively driving said finely divided material to increase its speed until its tangential velocity as it enters said inlet is equal to that of said vortex at the location of said inlet, the radial width of said classification zone $\Delta_r$ having a ratio with respect to the radius $r_t$ from the axis of rotation to said annular inlet between about 0.4 and 0.9.

14. A classifier for powder comprising rotatable structure including walls forming an annular unobstructed separating zone, means for rotating said structure, said walls converging from the outer portion thereof to the inner portion, openings through one of said walls intermediate the inner and outer limits of the classifying zone, means for directing air into the classifying zone for production of a free vortex therein, feeding means for the powder including radially disposed driving elements rotatable with said walls positively to drive the powder up to a speed which as its enters the classifying zone is equal to the tangential component of the air within the classifying zone, inward flow of air separating a lighter fraction of powder from a coarser fraction thereof, means for withdrawing inwardly flowing air and a lighter fraction from the inner boundary of said zone, and means for collecting said heavier fraction of said powder in a zone external to said rotating structure.

15. A classifier for finely divided material comprising two walls having opposed surfaces of revolution with the axial distance therebetween progressively increasing outwardly from an inner radial boundary $r_i$ to an outer radial boundary $r_o$ to form an annular classifying zone, means including directing vanes extending outwardly and about said outer boundary zone for producing at the outer boundary of said classifying zone an inwardly spiraling free vortex, one of said walls intermediate said inner and outer boundaries having an inlet for the finely divided material, means for adjustably mounting said vanes for relative movement thereof from positions substantially tangent to a circle symmetrical with the outer boundary of the classifying zone to angular positions in the direction of the axis of rotation of the vortex, and adjustable means including rotating driving elements for positively driving said finely divided material until its speed as it enters said inlet to the vortex is equal to the speed of said free vortex at the location of said inlet.

16. The classifier of claim 15 in which said vanes are disposed between confining surfaces, both of which are concentrically spherical, said vanes having circular edges closely spaced to said surfaces to permit said adjustment thereof without changing the spacing between them and said confining surfaces.

17. The method of classifying finely divided material on the basis of size and density which comprises directing streams of air between spaced walls of an annular classifying zone in directions to bring the body of air between said walls into an inwardly spiraling free-vortex flow, rotating the walls of said classifying zone, feeding said finely divided material into said classifying zone through an entrance located intermediate the inner and outer radial boundaries of said zone, prior to the entrance of the finely divided material into said zone positively driving it at an increasing speed for entry into said zone at a predetermined rotational speed, equalizing the rotational speeds of said vortex at said entrance with that of said walls and that of said finely divided material at said entrance, the centrifugal force exerted on said finely divided material in said classifying zone increasing from said outer boundary to said inner boundary thereof, equalizing said centrifugal force by increasing continuously from said outer boundary to said inner boundary the radial component of the air velocity and to a close approximation at the same rate of increase as said centrifugal force, continuously withdrawing from an inner boundary of said zone a fine fraction of said finely divided material, and continuously withdrawing from the periphery of said zone into a stationary collector a coarse fraction of said finely divided material.

18. The method of claim 17 in which the continuously increasing velocity of the air through said vortex is substantially decreased after leaving the inner boundary thereof.

19. The method of claim 17 in which said air and said fine fraction after leaving the inner annular boundary of said zone pass through a passage of gradually increasing cross-sectional area to reduce the pressure drop required for the flow of air through said zone.

20. The method of claim 17 in which said finely divided material is positively driven at said increasing speed by sub-dividing it into a plurality of streams extending generally radially of said zone and through flow channels rotated at the same speed as the walls of said classifying zone.

References Cited in the file of this patent

UNITED STATES PATENTS

| | | |
|---|---|---|
| 2,212,819 | Ahlmann | Aug. 27, 1940 |
| 2,616,563 | Hebb | Nov. 4, 1952 |

FOREIGN PATENTS

| | | |
|---|---|---|
| 477,791 | Canada | Oct. 16, 1951 |
| 834,319 | Germany | Mar. 17, 1952 |